United States Patent
Mor et al.

(10) Patent No.: US 9,507,977 B1
(45) Date of Patent: Nov. 29, 2016

(54) ENABLING PROXIMATE HOST ASSISTED LOCATION TRACKING OF A SHORT RANGE WIRELESS LOW POWER LOCATOR TAG

(71) Applicant: VSN TECHNOLOGIES, INC., Fort Lauderdale, FL (US)

(72) Inventors: Tal Mor, Coral Springs, FL (US); Navid Ghomeshi, Weston, FL (US); Jose Ruiz, Coral Springs, FL (US)

(73) Assignee: VSN TECHNOLOGIES, INC., Fort Lauderdale, FL (US)

( * ) Notice: Subject to any disclaimer, the term of this patent is extended or adjusted under 35 U.S.C. 154(b) by 0 days.

(21) Appl. No.: 14/530,942

(22) Filed: Nov. 3, 2014

(51) Int. Cl.
*G06K 7/10* (2006.01)
*H04W 4/00* (2009.01)

(52) U.S. Cl.
CPC ............. *G06K 7/10138* (2013.01); *G06K 7/10* (2013.01); *H04W 4/008* (2013.01)

(58) Field of Classification Search
CPC ....... G06K 7/10; G06K 7/10425; H04Q 5/22
USPC .................................... 340/10.31, 10.1, 10.6
See application file for complete search history.

(56) References Cited

U.S. PATENT DOCUMENTS

| | | | |
|---|---|---|---|
| 8,390,429 B2* | 3/2013 | Shiau | G06Q 10/08 340/10.1 |
| 2009/0153305 A1* | 6/2009 | Ambrosetti | G01S 5/0257 340/10.31 |
| 2014/0028447 A1* | 1/2014 | Howard | G06Q 10/087 340/10.6 |
| 2014/0240088 A1* | 8/2014 | Robinette | G08B 13/1427 340/5.61 |
| 2015/0070140 A1* | 3/2015 | Chakraborty | G06Q 50/00 340/10.31 |
| 2015/0084813 A1* | 3/2015 | Braiman | G01S 19/06 342/357.51 |
| 2015/0213295 A1* | 7/2015 | Ginsburg | H04W 64/00 340/10.1 |

* cited by examiner

*Primary Examiner* — Allen T Cao
(74) *Attorney, Agent, or Firm* — Patents on Demand P.A.; Brian K. Buchheit; Scott M. Garrett

(57) ABSTRACT

A host and a communicatively linked paired tag can be identified. The tag can be associated with a tracked entity. The tag can be a low power computing device which can provide a location of a tracked entity to the host. An out of range condition can be detected. The condition can result in communication between the host and the tag being temporarily interrupted. A last location of the tag can be established. A set of hosts proximate to the last location can be determined. The set of hosts can be queried to determine if the hosts have received an advertisement message from the tag. Each of the set of hosts can be linked to a different paired tag. A notification can be conveyed to the host when the set of hosts receives the message from the paired tag. The notification can include a new location of the paired tag.

19 Claims, 4 Drawing Sheets

ENABLING PROXIMATE HOST ASSISTED LOCATION TRACKING OF A SHORT RANGE WIRELESS LOW POWER LOCATOR TAG

BACKGROUND

The present invention relates to the field of low power device proximity sensing and, more particularly, to enabling proximate host assisted location tracking of a short range wireless low power locator tag.

As users' daily lives continue to get more hectic and unpredictable, technologies which help users with daily tasks and responsibilities have become an integral part of their lives. One device which has widespread use and appeal are locator tags for important/valuable items such as wallets, keys, and even electronics. Typically locator tags are attached to the item and a host device running an application paired to the tag via Bluetooth establishes tag location/state. These devices are often paired to a host device such as a mobile phone or computer. That is, the tags allow the tracked item to be "tethered" to a host device (e.g., like a leash). Frequently, BLUETOOTH locator tags are routinely used to alert users when items, children, or pets go out of range of a user's mobile phone. For example, when a pet wanders out of range of the mobile phone an audible alarm can be triggered on the mobile phone and/or on the tag to indicate to the user that their pet is wandering out of range. However, once the device is out of range, there is no way to locate the device or even estimate how far it has gone.

BRIEF SUMMARY

One aspect of the present invention can include a system, an apparatus, a computer program product, and a method for enabling proximate host assisted location tracking of a short range wireless low power locator tag. A host and a communicatively linked paired tag can be identified. The tag can be associated with a tracked entity. The tag can be a low power computing device which can provide a location of a tracked entity to the host. An out of range condition can be detected. The condition can result in communication between the host and the tag being temporarily interrupted. A last location of the tag can be established. A set of hosts proximate to the last location can be determined. The set of hosts can be queried to determine if the hosts have received an advertisement message from the tag. Each of the set of hosts can be linked to a different paired tag. A notification can be conveyed to the host when the set of hosts receives the message from the paired tag. The notification can include a new location of the paired tag.

Another aspect of the present invention can include an apparatus, a computer program product, a method and a system for enabling proximate host assisted location tracking of a short range wireless low power locator tag. A location engine can be configured to locate a paired tag residing out of range from a previously communicatively linked host. The paired tag can be a low power computing device. The tag can be associated with a tracked object. A data store can be able to persist a host registry. The host registry can include a host identifier, a tag identifier, and a location.

Yet another aspect of the present invention can include a system, an apparatus, a method and a computer program product that includes a computer readable storage medium having embedded computer usable program code. The computer usable program code can be configured to detect an out of range condition associated with a paired tag. The paired tag can be previously communicatively linked with a host. The host and the tag can be out of range of each other resulting in a loss of the communication link between the host and the tag. An advertising mode can be triggered responsive to the detection. The advertising mode can be a non-connectable unidirected broadcast mode configured to transmit packets carrying Bluetooth low energy advertising information on dedicated broadcast radio frequency channels. An advertising mode can be exited responsive to an in range condition detection. The in range condition detection can occur when the host is in range of the tag and the communication link is re-established.

DETAILED DESCRIPTION

Figure 1:
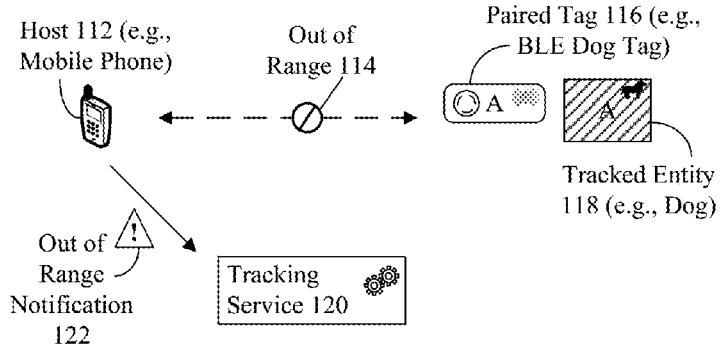
FIG. 1 is a schematic diagram illustrating a set of scenarios for enabling proximate host assisted location tracking of a short range wireless low power locator tag in accordance with an embodiment of the inventive arrangements disclosed herein.
Figure 1:
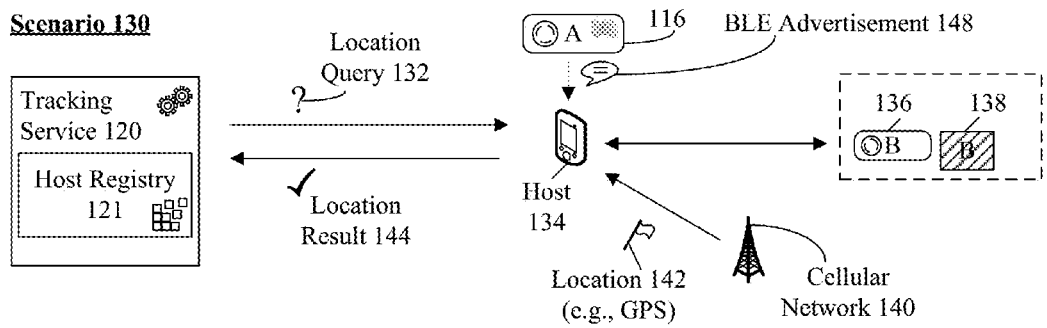
Figure 1:
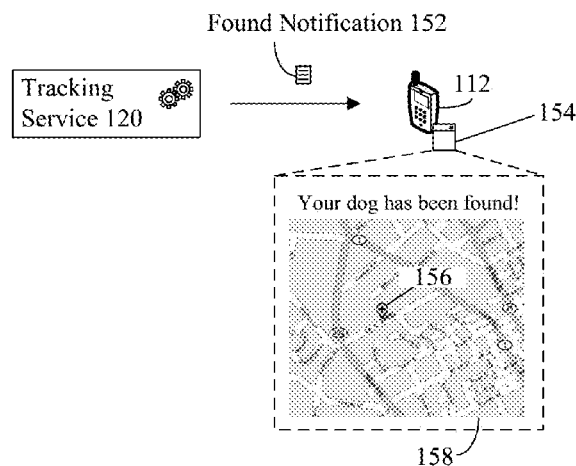

The present disclosure is a solution for enabling proximate host assisted location tracking of a short range wireless low power locator tag. In the solution, a locator tag paired with a host device can be associated with a tracked entity. For example, the tag can be attached to a laptop computer and "tethered" to a mobile phone. In one instance, the host can be subscribed to a locator service which can aid in re-locating a lost/out of range locator tag. In one embodiment, when the tag is out of range of the host device, the tag can enter an advertising mode to broadcast the tag presence. In the embodiment, a similar host proximate to the tag can detect the broadcast and convey an appropriate location to the locator service. The service can convey the location to the host device which can allow the host device find the locator tag. For example, the service can convey a GPS location to the host device which can direct a user to a locator tag via a navigation application which can present the GPS location within a map.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 110, 130, 150 for enabling proximate host assisted location tracking of a short range wireless low power locator tag in accordance with an embodiment of the inventive arrangements disclosed herein. Scenarios 110, 130, 150 can be performed in the context of method 200, system 300 and/or embodiment 410. It should be appreciated that scenario 110, 130, 150 can be performed in sequence.

As used herein, tag 116, 136 can be a discrete electronic device utilized to determine a relative and/or absolute location of a tracked entity 118, 138. Device 116, 136 can be a low power device, ultra low power device, and the like. In one embodiment, device 116, 136 can be a BLUETOOTH LOW ENERGY (BLE) device including, but not limited to, a BLE module (e.g., circuit board), a BLE software stack, a BLE communication stack (e.g., host/controller stack), and the like. Device 116, 136 can be communicatively paired to a host 112, 134. For example, device 116 can be a BLUETOOTH key finder tag attached to a set of keys on a keyring which can be triggered to produce an audible alert to allow a person to find the set of keys. It should be appreciated that device 116, 136 can include multiple pairing functionality. It should be appreciated that paired tag 116 need not be paired to the host (e.g., host 112) to permit the disclosure to function. That is, tag 116 is paired to host 112 in scenario 110, 130, 150 for exemplary purposes only. It should be appreciated that tag 116, 136 can be embedded within tracked entity 118, 138.

Tracked entity 118, 138 can be an electronic device, an electromechanical device, a non-electronic object, an animal, a person, and the like. Entity 118, 138 can be stationary, moveable, and the like.

In one embodiment, tracking service 120 can be a location based computing service able to aid in tag 116 locating. In the embodiment, service 120 can be a subscription based service which can permit host 112 to dynamically track tag 116 when the tag 116 is out of range.

In scenario 110, a host 112 can be communicatively linked to a paired tag 116 which can be associated with a tracked entity 118. For example, host 112 can be a mobile phone connected to a BLUETOOTH LOW ENERGY dog tag (e.g., 116) attached to a dog collar of a dog (e.g., 118). It should be appreciated that tag 116 can be a short range communication device which can be paired to a host 112. In one instance, tracking service 120 can provide a mechanism for host 112 to reestablish connectivity with tag 116 when tag 116 is out of range 114. In the instance, host 112 can communicate an out of range notification 122 to service 120 (e.g., Service Discovery). In one configuration of the instance, the out of range notification 122 can include a last known location of tag 116. In one instance, the disclosure can leverage similar hosts (e.g., 134) to track tag 116 when tag is out of range 114. In the instance, hosts with similar paired tags, similar hardware, and the like can be determined and utilized to track tag 116.

In scenario 130, tracking service 120 can utilize a host registry 121 to identify a host 134 proximate to a last known location of tag 116. In one embodiment, host registry 121 can be store host 112, 134 location data to determine host 112, 134 proximity. In one instance, a location query 132 can be performed to alert host 134 that tag 116 is out of range 114. In the instance, host 134 can be configured to listen for a BLE advertisement message from tag 116. For example, host 134 can be utilized to find tag 116 when tag is proximate to host 134. It should be appreciated that host 134 can be communicatively linked to a tag 136 linked to a tracked entity 138. In one embodiment, tag 116 can activate an advertising mode which can periodically broadcast a BLE advertisement 148. In the embodiment, advertisement 148 can include tag identifiers, tag state (e.g., moving, stationary), tag status data (e.g., low battery, uptime), and the like. In one configuration of the embodiment, host 134 can receive advertisement 148 and location 142 can be obtained. In the configuration, location 142 can be obtained from a cellular network 140, a wireless network, and the like. That is, since tag 116 can be a short range device, host 134 location can be utilized to approximate tag 116 location. In one embodiment, advertisement 148 can be performed at static intervals, dynamic intervals, and the like. For example, advertisement 148 can be increased the longer the tag is out of range up to a maximum frequency (e.g., to conserve power usage). In one configuration of the embodiment, tag 116 can be associated with an advertisement setting which can be utilized to control an advertisement mode. In the configuration of the embodiment, settings can include, but is not limited to, operating power levels, broadcast frequency, timeout thresholds, and the like. For example, advertisement setting can be a configuration parameter of a BLE Find Me Profile (FMP).

Location result 144 can be communicated to tracking service when tag 116 advertisement 148 is received by host 134. In one embodiment, location result 144 can update host registry 121 which can be utilized to aid in reuniting host 112 and tag 116. In one instance, the location result 144 can include Indoor Positioning System (IPS) coordinates, (GPS) coordinates, and the like. For example, the location can be determined utilizing Wi-Fi positioning system (WPS) where GPS is inadequate. It should be appreciated that one or more localization techniques can be used for positioning including, but not limited to, triangulation, RSSI based localization, and the like.

In scenario 150, service 120 can convey a found notification 152 to host 112 to alert host 112 of tag 116 location. In one embodiment, notification 152 can be presented within an interface 154 of host 112. In one configuration of the embodiment, notification 152 can trigger a map 158 to be presenting, indicating a location 156 where tag 116 can be found. For example, notification 152 can alert a user 112 that their dog is wandering down a sidewalk of a street and directions can be provided to assist the user in reaching the location 156.

Drawings presented herein are for illustrative purposes only and should not be construed to limit the invention in any regard. It should be appreciated that scenario 110, 130, 150 can conform to a push architecture, a pull architecture, a hybrid architecture, and the like. In one embodiment, the host 134 communication with tag 116 can be connectionless (e.g., listen only). That is, host 134 can receive advertisements from a non-connectable unidirected broadcast. In another embodiment, host 134 communication with tag 116 can be connection oriented. In the embodiment, host 134 can obtain data to indicate direction and speed of the tracked entity.

It should be appreciated that the scenario 110, 130, 150 can be associated with one or more threshold values for initiating query 132, limit tracking duration, and the like. For example, a threshold can be utilized to determine when to convey an out of range notification 122 based on the duration of out of range 114 condition. In another example, a threshold value can be used to limit the search duration and/or determine actions to be taken after the threshold is reached.

It should be understood that out of range notification 122 can include host 112 location, tag 116 location, and the like. That is, notification 122 can indicate the last known location (e.g., absolute/relative) of tag 116.

It should be appreciated that tag 116, 136 can utilize Generic Attribute Profile (GATT) scheme. It should be understood that GATT can include, but is not limited to, a client/server (e.g., host/paired tag) architecture, a service, and the like. In one instance, service 120 can be a BLE service of a host 112, 134.

Figure 2:
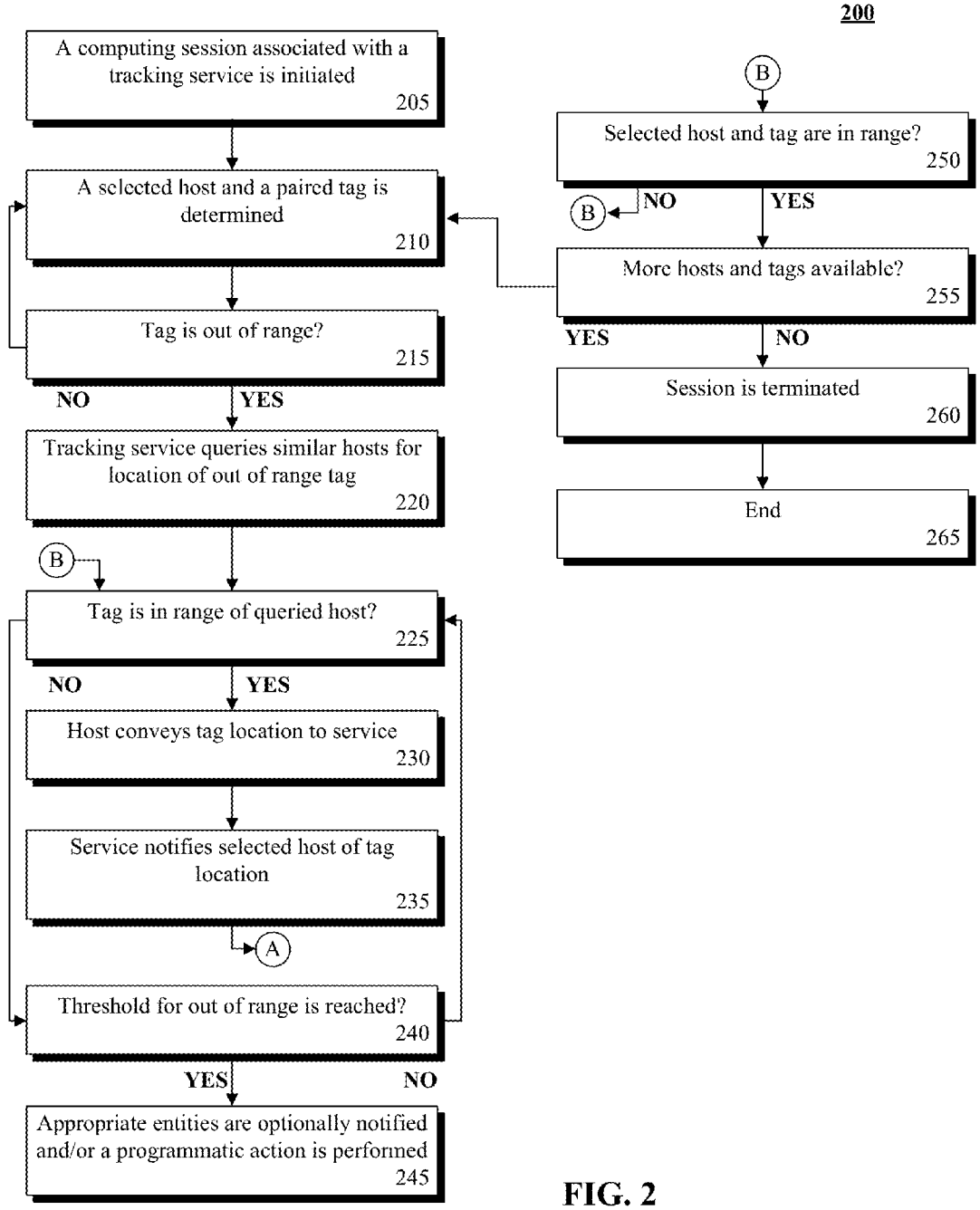
FIG. 2 is a schematic diagram illustrating a method for enabling proximate host assisted location tracking of a short range wireless low power locator tag in accordance with an embodiment of the inventive arrangements disclosed herein.

FIG. 2 is a schematic diagram illustrating a method 200 for enabling proximate host assisted location tracking of a short range wireless low power locator tag in accordance with an embodiment of the inventive arrangements disclosed herein. Method 200 can be performed in the context of scenarios 110, 130, 150, system 300, and/or embodiment 410.

In step 205, a computing session associated with a tracking service can be initiated. In step 210, a selected host and a paired tag can be determined. In step 215, if tag is out of range, the method can continue to step 220, else return to step 210. In step 220, the tracking service can query similar hosts for the location of the out of range tag. In step 225, if the tag is in range of a queried host, the method can continue to step 230, else proceed to step 240. In step 230, the host can convey the tag location (or the host location) to the service. In step 234, the service can notify the selected host of the tag location. In step 240, if the threshold for out of range is reached, the method can continue to step 245, else return to step 225. In step 245, appropriate entities can be optionally notified and/or a programmatic action can be performed. For example, when the threshold is reached, an emergency response entity can be automatically notified.

In step 250, if the selected host and tag are in range, the method can continue to step 255, else return to step 225. In step 255, if more hosts and tags are available, the method can return to step 210, else continue to step 260. In step 260, the session can be terminated. In step 265, the method can end.

Drawings presented herein are for illustrative purposes only and should not be construed to limit the invention in any regard. It should be appreciated that method 200 can be performed in real-time or near real-time. Further, method 200 can be performed in serial and/or in parallel. It should be appreciated that steps 210-255 can be iteratively performed for each host registered with the service. It should be appreciated that the paired tag (e.g., step 210) need not be paired to the host (e.g., step 210) to permit the method to execute. That is, the tag is paired to the host in step 210 for exemplary purposes only.

Figure 3:
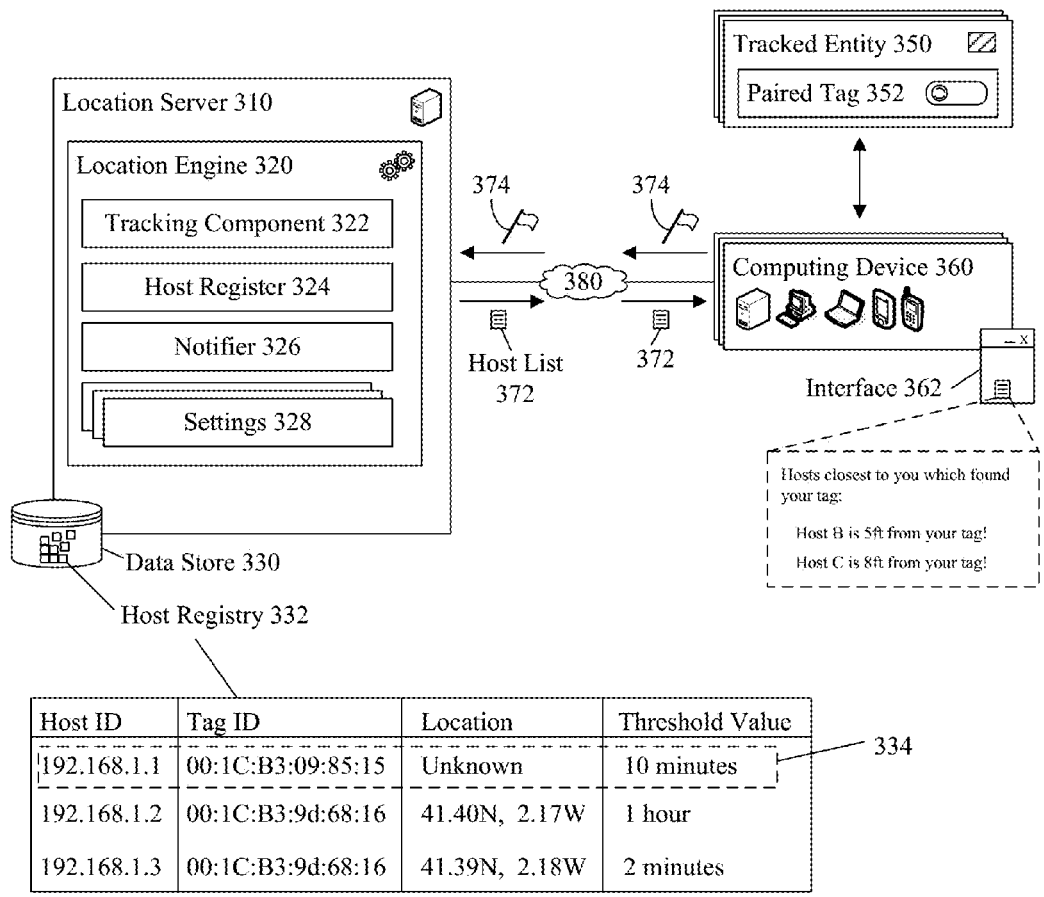
FIG. 3 is a schematic diagram illustrating a system for enabling proximate host assisted location tracking of a short range wireless low power locator tag in accordance with an embodiment of the inventive arrangements disclosed herein.

FIG. 3 is a schematic diagram illustrating a system 300 for enabling proximate host assisted location tracking of a short range wireless low power locator tag in accordance with an embodiment of the inventive arrangements disclosed herein. System 300 can be present in the context of scenario 110, 130, 150, method 200, and/or embodiment 410. System 300 components can be communicatively linked via one or more networks 380. In one instance, server 310 can be communicatively linked to device 360. It should be appreciated that paired tag 352 can be directly linked (e.g., host/controller based communication) to device 360.

In one embodiment, when device 360 is unable to communication with tag 352, engine 320 can convey a host list 372 to device 360. In the embodiment, host list 372 can be utilized to manually locate the tag 352. Upon successful communication with tag 352, notification 374 can be conveyed to update host registry 332 with tag state and/or location.

Location server 310 can be a hardware/software entity for executing location engine 320. Server 310 functionality can include, but is not limited to, file sharing, load balancing, and the like. Server 310 can include, but is not limited to, location engine 320, data store 330, an interface, and the like. Server 310 can be a component of a networked computing environment, distributed computing environment, and the like.

Location engine 320 can be a hardware/software element for assisting with tag 352 retrieval. Engine 320 functionality can include, but is not limited to, session management, communication handling, and the like. Engine 320 can include, but is not limited to, tracking component 322, host register 324, notifier 326, settings 328, and the like. In one instance, engine 320 can be a functionality of a host device (e.g., computing device 360). In one embodiment, engine 320 functionality can be present within a Web-based service.

Tracking component 322 can be a hardware/software entity for performing tag 352 searching. Component 322 functionality can include, but is not limited to, host querying, host configuration, and the like. In one instance, tracking component 322 can utilize threshold values (e.g., entry 334) to perform tag 352 activities. In the instance, threshold value can be utilized to begin or end a tag 352 search operation. For example, if a tag is not found within ten hours, the search operation can be terminated.

Host register 324 can be a hardware/software element for registering host devices within host registry 332. Register 324 functionality can include, but is not limited to, host detection, host communication, and the like. In one instance, register 324 can dynamically and/or automatically update/manage host registry 332. In the instance, registry 332 can permit proximate host determination operations which can be performed during a tag 352 search functionality.

Notifier 326 can be a hardware/software entity for conveying host list 372 to device 360 and/or receiving notification 374. Notifier 326 functionality can include notification construction, notification transmission, and the like. In one embodiment, notifier 326 can be a functionality of device 360 and/or server 310. In one instance, notifier can utilize host registry 332 to create a notification of proximate hosts receiving advertisements from an out of range paired tag 352. In the instance, the host list 372 can be presented within an interface 362.

Settings 328 can be one or more rulesets for establishing the behavior of server 310, engine 320, and/or system 300. Settings 328 can include, but is not limited to, tracking component 322, host register 324, notifier 326, and the like. In one instance, settings 328 can include security policy options, reconfiguration settings, and the like. Setting 328 can be manually and/or automatically determined. In one instance, setting 328 can be configured via interface 362.

Data store 330 can be a hardware/software component able to persist host registry, notification 374, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Host registry 332 can be a data set for enabling tag 352 locating during communication failure with device 360. Registry 332 can include, but is not limited to, a host identifier, a tag identifier, a location identifier, and a threshold value 335. It should be appreciated that registry can be arbitrarily complex. In one instance, one or more values can be utilized to determine tag out of range condition frequency, common locations, and the like. That is, registry can include one or more metrics associated with host and/or tag.

Tracked entity 350 can be associated with paired tag 352. In one instance, paired tag 352 can be physically, electromechanical, and/or mechanically linked to entity 350. Paired tag 350 can 352 can conform to one or more host/controller communication schemes including, but not limited to, BLUETOOTH, BLUETOOTH LOW ENERGY, ZIGBEE, ANT, and the like. It should be appreciated that the paired tag 352 need not be paired to the host 360 to permit the system to function. That is, the tag 352 is paired to the host in step 360 for exemplary purposes.

Computing device 360 can be a hardware/software permitting the execution of engine 320 and/or engine 320 components. Device 360 can include, but is not limited to, input/output components, user settings, interface 362, and the like. Computing device 360 can include, but is not limited to, a desktop computer, a laptop computer, a tablet computing device, a personal digital assistant (PDA), a mobile phone, and the like. Interface 362 can be a user interactive component permitting interaction and/or presentation of host list 372. Interface 362 capabilities can include a graphical user interface (GUI), voice user interface (VUI), mixed-mode interface, and the like. In one instance, interface 362 can be communicatively linked to computing device 360.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. In one embodiment, the system 300 can conform to a Service Oriented Architecture. In one instance, engine 320 can permit a peer based location scheme. In the instance, engine 320 can be present within device 360 (e.g., host)

which can communicate with proximate hosts to assist in locating an out of range tag 352.

Figure 4:
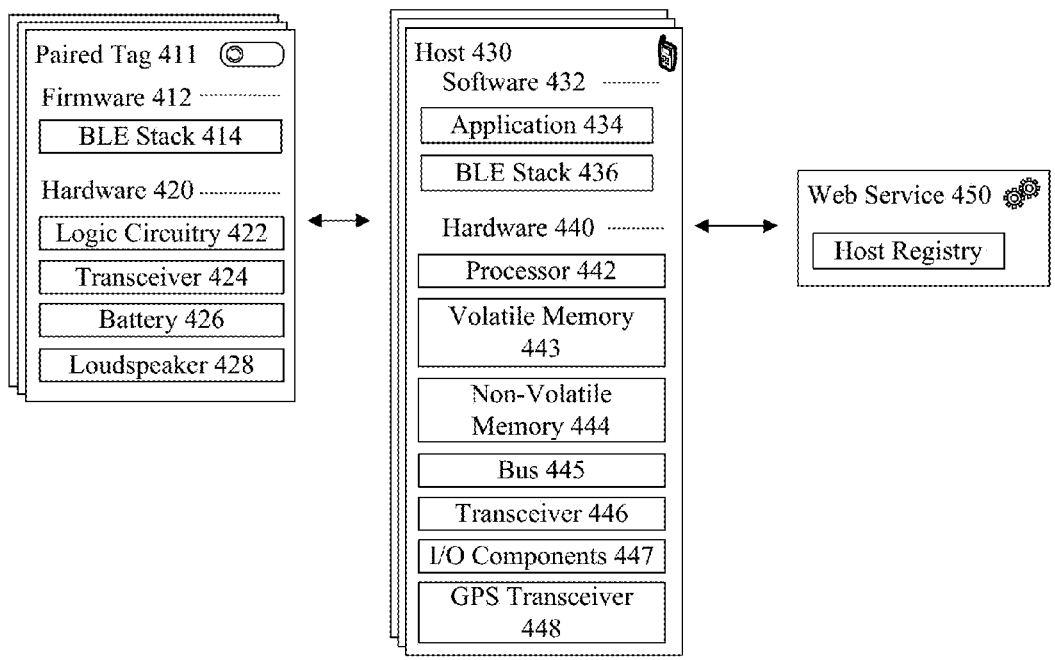
FIG. 4 is a schematic diagram illustrating an embodiment for enabling proximate host assisted location tracking of a short range wireless low power locator tag in accordance with an embodiment of the inventive arrangements disclosed herein.

FIG. 4 is a schematic diagram illustrating an embodiment 410 for enabling proximate host assisted location tracking of a short range wireless low power locator tag in accordance with an embodiment of the inventive arrangements disclosed herein. Embodiment 410 can be present in the context of scenario 110, 130, 150, method 200, and/or system 300. In embodiment 410, a paired tag 411 can be communicatively linked to a host 430. In another embodiment, paired tag 411 can lack a previously established communication link with the host 430. In the embodiment 410, host 430 can be communicatively linked to a Web service 450 which can permit rapid locating of an out of range tag 410.

Paired tag 410 can include a firmware 412 and/or a hardware 420. Firmware 412 can include, but is not limited to, a BLUETOOTH LOW ENERGY (BLE) stack 414 (e.g., controller), logic code, and the like. Hardware 420 can include, but is not limited to, logic circuitry 422, transceiver 424, battery 426, loudspeaker 428, a non-volatile memory (e.g., EEPROM), a volatile memory, and the like. In one instance, tag 410 can be a wireless BLE locator tag powered by a coin cell battery with an operating range of approximately one hundred meters. It should be appreciated that tag 410 can be associated with security mechanisms including, but not limited to, encryption, authentication, pairing, and the like.

Host 430 can include, but is not limited to, software 432, hardware 440, and the like. Software 432 can include, but is not limited to an application 434, a BLE stack (e.g., host), an operating system, and the like. Hardware 440 can include, but is not limited to, a processor 442, a volatile memory 443, non-volatile memory 444, a bus 445, a transceiver 446, input/output components 447, a GLOBAL POSITIONING SYSTEM (GPS) transceiver 448, and the like. In one instance, server 450 can be a functionality of an application 434.

Web service 450 can include, but is not limited to, a host registry, authentication data, and the like. In one instance, service 450 can be a tiered subscription based service permitting premium subscribers selective and/or enhanced services not available to non-premium subscribers.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for paired tag locating comprising:
   identifying a host and a communicatively linked paired tag, wherein the paired tag is associated with a tracked entity, wherein the paired tag is a low power computing device which can provide a location of a tracked entity to the host;
   detecting an out of range condition, wherein the out of range condition results in communication between the host and the paired tag being temporarily interrupted;
   establishing a last location of the tag prior to the out of range condition detection;
   determining a set of hosts proximate to the last location associated with the paired tag before out of range condition is detected;
   querying at least one of the set of hosts to determine if the hosts have received an advertisement message from the paired tag, wherein each of the set of hosts is linked to a different paired tag;
   when the at least one of the set of hosts receives the message from the paired tag, conveying a notification to the host, wherein the notification comprises of a new location of the paired tag.

2. The method of claim 1, wherein the a communication linked is not previously established between the paired tag and the tracked entity.

3. The method of claim 1, wherein when the paired tag is out of range of the host, the paired tag is triggered to enter an advertising mode, wherein the mode is a non-connectable unidirected broadcast mode.

4. The method of claim 1, wherein the paired tag is BLUETOOTH LOW ENERGY device comprising of at least one of a battery, a piezoelectric speaker, a transceiver, and a logic circuitry.

5. The method of claim 1, wherein the at least one of the set of hosts receives the message from a connectionless communication with the paired tag.

6. The method of claim 1, wherein the message comprises of at least one of a tag identifier, an operating power output of the tag, and a battery status.

7. The method of claim 1, wherein the host is proximate to the tag, triggering the tag to exit an advertising mode, wherein the mode is a non-connectable unidirected broadcast mode.

8. The method of claim 1, wherein the hardware and/or software of the at least one of the set of hosts is approximately identical to the hardware and/or software of the host.

9. The method of claim 1, further comprising: the host in absence of the querying, periodically scanning a broadcast frequency for a non-connectable unidirected broadcast from a tag operating in a non-connectable unidirected broadcast mode;
   when the host detects an advertisement from the tag, relaying a media access control address of the tag to a computing device communicatively linked to the host.

10. The method of claim 1, further comprising:
    determining the location of at least three hosts of the set of hosts proximate to the tag able to detect the tag;
    performing a triangulation operation to refine the tag location based on the location of the at least three hosts.

11. A system for paired tag locating comprising:
    a location engine configured to locate a paired tag residing out of range from a previously communicatively linked host, wherein the paired tag is a low power computing device, wherein the tag is associated with a tracked object;
    a data store able to persist at least one of a host registry, wherein the host registry comprises of a host identifier, a tag identifier, and a location;
    a tracking component configured to manage the location of a plurality of hosts, wherein the plurality of hosts comprises of the previously linked host and a set of different hosts, wherein the set of different hosts is proximate or remote to the paired tag;
a host register able to detect at least one of the host identifier and a host location of at least one of the plurality of hosts; and
a notifier configured to convey a notification to the previously linked host when at least one of the plurality of hosts receives an advertisement message from the paired tag, wherein the notification comprises of a new location of the paired tag.

12. The system of claim 11, wherein the paired tag is BLUETOOTH LOW ENERGY device comprising of at least one of a battery, a piezoelectric speaker, a transceiver, and a logic circuitry.

13. The system of claim 11, wherein when the paired tag is out of range of the host, the paired tag is triggered to enter an advertising mode.

14. The system of claim 11, wherein when the paired tag is in range of the host, the paired tag is triggered to exit an advertising mode.

15. The system of claim 11, wherein the notification indicates a direction and a speed of the tag.

16. The system of claim 11, wherein the set of different hosts receives the message from a connectionless communication with the paired tag.

17. A computer program product comprising a computer readable storage medium having computer usable program code embodied therewith, the computer usable program code comprising:

computer usable program code stored in a storage medium, if said computer usable program code is executed by a processor it is operable to detect an out of range condition associated with a paired tag, wherein the paired tag is previously communicatively linked with a host, wherein the host and the tag are out of range of each other resulting in a loss of the communication link between the host and the tag;

computer usable program code stored in a storage medium, if said computer usable program code is executed by a processor it is operable to trigger an advertising mode responsive to the detection, wherein the advertising mode is a non-connectable unidirected broadcast mode configured to transmit packets carrying Bluetooth low energy advertising information on dedicated broadcast radio frequency channels;

computer usable program code stored in a storage medium, if said computer usable program code is executed by a processor it is operable to exit an advertising mode responsive to an in range condition detection, wherein the in range condition detection occurs when the host is in range of the tag and the communication link is re-established.

18. The computer program product of claim 17, wherein the packets comprise of a message, wherein the message comprises of at least one of a tag identifier, an operating power output of the tag, and a battery status.

19. The computer program product of claim 17, wherein the paired tag is BLUETOOTH LOW ENERGY device comprising of at least one of a battery, a piezoelectric speaker, a transceiver, and a logic circuitry.

* * * * *